United States Patent [19]

Jones et al.

[11] Patent Number: 5,685,694

[45] Date of Patent: Nov. 11, 1997

[54] AIR DRIVEN TURBINE HAVING A BLADE PITCH CHANGING MECHANISM INCLUDING OVERSPEED PROTECTION

[75] Inventors: Teddy L. Jones, Cherry Valley; Jon B. Althof, Loves Park, both of Ill.

[73] Assignee: Sundstrand Corporation, Rockford, Ill.

[21] Appl. No.: 553,189

[22] Filed: Nov. 7, 1995

[51] Int. Cl.$^6$ ................................................ F04D 29/36
[52] U.S. Cl. ........................ 416/147; 416/163; 416/164
[58] Field of Search ......................... 416/44, 147, 163, 416/164

[56] References Cited

U.S. PATENT DOCUMENTS

| | | | |
|---|---|---|---|
| 1,833,403 | 11/1931 | Newton . | |
| 2,307,101 | 1/1943 | Blanchard et al. | 170/163 |
| 2,460,559 | 2/1949 | Wildhaber | 170/160.11 |
| 2,514,477 | 7/1950 | Cushman | 170/160.11 |
| 2,518,431 | 8/1950 | Wildhaber | 170/160.11 |
| 2,533,358 | 12/1950 | Cushman | 170/160.11 |
| 2,566,696 | 9/1951 | Cushman | 170/160.11 |
| 2,655,998 | 10/1953 | Martin | 170/160.21 |
| 3,794,442 | 2/1974 | McMurtry | 416/145 |
| 4,411,596 | 10/1983 | Chilman | 416/51 |
| 4,578,019 | 3/1986 | Safarik | 416/1 |
| 4,671,737 | 6/1987 | Whitehouse | 416/165 |
| 4,717,312 | 1/1988 | Seeley | 416/145 |
| 4,917,332 | 4/1990 | Patterson, Jr. | 244/58 |
| 4,948,339 | 8/1990 | Adamson | 416/145 |
| 5,090,869 | 2/1992 | Wright | 416/147 |
| 5,141,399 | 8/1992 | Duchesneau et al. | 416/157 R |
| 5,145,318 | 9/1992 | Olson | 416/164 |
| 5,150,859 | 9/1992 | Ransick | 244/58 |
| 5,161,948 | 11/1992 | Carvalho et al. | 416/46 |
| 5,213,471 | 5/1993 | Miller et al. | 416/44 |
| 5,257,907 | 11/1993 | Seidel | 416/137 |
| 5,281,095 | 1/1994 | Komura et al. | 416/147 |
| 5,290,147 | 3/1994 | Karls et al. | 416/44 |

*Primary Examiner*—John T. Kwon
*Attorney, Agent, or Firm*—Lawrence E. Crowe

[57] ABSTRACT

An air driven turbine having variable pitched blades is provided that includes a pitch change mechanism for adjusting the pitch of the blades during either rotating or non-rotating operational modes of the air driven turbine. The pitch control mechanism includes a resettable overspeed protection device which is directly actuated by an overspeed condition of the turbine and operates independently from the pitch change mechanism to move the blades to a failsafe, feathered, or coarse pitch, low speed position. The pitch control mechanism utilizes a linear actuator in the form of an acme screw drive. The air driven turbine includes a ball ramp thrust bearing for attaching the blades to a hub of the turbine in such a manner that during rotation of the turbine actuation loads on the pitch change mechanism are reduced.

9 Claims, 6 Drawing Sheets

$$F_{act} = \frac{(T_{br} - T_{ctm} - T_{atm}) \times N}{R \times \cos \phi_y}$$

AIR DRIVEN TURBINE HAVING A BLADE PITCH CHANGING MECHANISM INCLUDING OVERSPEED PROTECTION

TECHNICAL FIELD

Our invention relates to air driven turbines of the type utilized for extracting energy from air flowing about an aircraft in flight. More particularly, our invention relates to a pitch changing mechanism including overspeed protection for controlling the blade pitch of a blade of such air driven turbines.

BACKGROUND

Air driven turbines are utilized on aircraft for extracting energy from air flowing about an aircraft in flight to provide power for auxiliary or emergency power generating devices carried by the aircraft. Typically, the air driven turbine includes a hub mounted on the aircraft for rotation about an axis of rotation. One or more blades are attached to the hub to cause rotation therefor when an airstream is directed across the blades.

In modern aircraft, the airstream directed across the blades is typically created by free air flowing past the aircraft while it is in flight, and is commonly known as "ram air". Ram air is created by forward motion of the aircraft along a flightpath. Air driven turbines that extract power from ram air are commonly known as "ram air turbines", or "RATs". RATs have been utilized on aircraft for many years for driving electrical generators, or hydraulic pumps which provide a source of emergency power to certain flight-critical aircraft systems during in-flight situations where main engine power has been lost. RATs have also been utilized for powering pod mounted equipment, including refueling or avionics pods.

In the future, air driven turbines known as "vortex turbines" will also be utilized to extract energy from swirling vortices of air emanating from an aircraft in flight. These vortices are a by-product of creating lift in the wings, etc. of the aircraft. Airflow in a vortex is distinguished from ram air flow by the direction of flow. Ram air flows in a direction essentially counter-parallel to the direction of flight. Vortex flow forms an essentially helical, spiraling air flow extending behind the aircraft about a vertical axis which is generally parallel to the direction of flight. For a large commercial aircraft, a vortex emanating from one of the wingtips can have a strength of several hundred horsepower. The energy in the vortex represents a drag loss on the aircraft. The vortex also presents a significant threat of loss of control for small aircraft passing through the vortex, even at distances of several miles behind the aircraft creating the vortex. U.S. Pat. Nos. 4,917,332 to Patterson, and 5,150,859 to Ransick describe vortex turbines for extracting power from vortices generated at aircraft wingtips to reduce drag and provide power for on-board systems of the aircraft.

Air driven turbines on future aircraft will likely be designed to extract energy from a combination of ram air and vortex air flow. Regardless of the source of the air flow, both modern and future air driven turbines will in many instances utilize variable pitch blades for controlling rotational speed or power output of the turbine. In modern RATs, for example, a flyball governor driven pitch control system is often utilized for adjusting blade pitch to maintain the rotational speed of the turbine at a constant value regardless of the flight speed of the aircraft. This is often done where the turbine drives an electrical generator in order to ensure that the generator will produce power at a constant frequency, of 400 HZ for example. The flyball governor of a typical RAT utilizes a mechanical governor with large springs and counterweights to automatically control speed. U.S. Pat. Nos. 5,257,907 to Seidel and 4,411,596 to Chilman are illustrative of this approach.

Vortex turbines are sometimes operated in a non-rotating mode, i.e. with the hub locked against rotation, for vortex dissipation and drag reduction only. In such a dissipation or drag reduction mode, it is desirable to adjust the pitch of the blades as a function of airspeed to maximize dissipation and drag reduction. Vortex turbines operating in a non-rotating mode thus require a pitch changing mechanism which can control blade pitch independent of the rotational speed of the turbine. The mechanical, spring driven, flyball governor pitch control systems utilized in the past for RATs is thus not applicable in some instances for vortex turbines, or for future air driven turbines which function as both RATs and vortex turbines.

In some RATs and rotating vortex turbines a fail-safe overspeed protection mechanism is required to limit maximum operating speed of the turbine, in order to prevent destructive overload conditions on the blades, etc., should the pitch control system fail. One commonly used approach to solving this problem is to provide a mechanism for forcing the blades to a feathered, or coarse pitch, (low speed) position, should an overspeed condition occur. U.S. Pat. Nos. 4,578,019 to Safarick and 4,671,737 to Whitehouse illustrate prior approaches to providing pitch control systems including such overspeed protection mechanisms.

Safarick utilizes a motor driven pitch control system, including a reference shaft driven at constant speed, to provide both the pitch change and overspeed control functions. Since the overspeed protection function is not operable independently from the pitch change mechanism, however, a single failure anywhere in the pitch control system of Safarick can also result in loss of the overspeed protection function.

Whitehouse uses a motor driven pitch control system coupled with a spring driven, solenoid activated, overspeed mechanism for disengaging the pitch change mechanism and driving the blades to a fail-safe position. The solenoid is activated by an external control loop which senses an overspeed condition and activates the solenoid. Although the overspeed protection device functions essentially independently from the pitch change mechanism, the need for providing an external control loop operating indirectly to decouple the pitch change device and feather the blades creates a risk of overspeed should the external control loop fail to operate.

Accordingly, it is an object of this invention to provide an air driven turbine having a pitch control system that includes a straightforward means for providing overspeed protection. Other objects of our invention include providing:

1) a pitch control system as above in which the overspeed protection mechanism functions independently from the pitch control function;
2) a pitch control system as above which is operable when the turbine is not rotating;
3) an overspeed protection device of straightforward construction and operation which is compatible with a wide variety of pitch change systems including those which use spring driven flyball governor actuators, and those which use electric or fluid motor driven pitch change actuators;
4) an air driven turbine as above which is operable as either a RAT or a vortex turbine;

5) an overspeed protection device which is readily resettable after preventing an overspeed condition; and 6) an air driven turbine with adjustable pitch blades and overspeed protection or straightforward design which can be readily manufactured at low cost and weight, and which provides enhanced reliability.

SUMMARY

Our invention provides an air driven turbine having variable pitch blades that satisfies the objects above through the use of a resettable overspeed protection device which is directly actuated by an overspeed condition of the turbine and operates independently from the pitch change mechanism to move the blades to a failsafe, feathered, or coarse pitch, low speed position. The overspeed device of our invention is readily resettable during servicing of the air driven turbine subsequent to the overspeed condition. The overspeed protection device of our invention is readily applicable to a variety of pitch change mechanisms suitable for use in both rotating and non-rotating air driven turbines.

A preferred embodiment of our invention utilizes a linear actuator operably coupled through the overspeed protection device to adjust blade pitch at normal operating speeds of the turbine. Should the turbine exceed a predetermined maximum acceptable speed, a flyball operated trigger mechanism within the overspeed device automatically disconnects the linear actuator from the blade, and an independent return spring drives the blades to a failsafe condition.

According to one aspect of our invention, the linear actuator includes an irreversible acme screw drive. The irreversible acme screw drive provides an additional safety feature, in that should the pitch control mechanism of our invention fail, the blades will remain in the last commanded position rather than being free to rotate about a pitch axis under the influence of an air stream passing through the blades. Additionally, the acme screw drive inherently provides a significant amount of damping, thereby allowing the pitch control system to be less complex than former pitch control systems which use other types of drives, such as ball screws, that required additional brake elements or control complexity to provide significant damping in order to achieve stable control.

In a highly preferred embodiment of our invention, ball ramp bearing means are provided for operably attaching the blades to the hub of the air driven turbine in such a manner that centrifugally generated forces acting on the blades during rotation of the hub operate to aid the pitch change mechanism in adjusting the blade pitch of the blades, thereby reducing the actuation load on the pitch change mechanism and the overspeed protection device. By reducing the actuation load on the pitch change mechanism, the various components and elements of the pitch change mechanism may be made physically smaller and lighter than they would otherwise have to be. Reducing the actuation load also tends to enhance performance of the pitch change mechanism by reducing response time of the pitch change mechanism.

Other objects, advantages and novel features of our invention will be readily apparent upon consideration of the following drawings and detailed descriptions of preferred embodiments.

DESCRIPTION OF THE INVENTION

Figure 1:
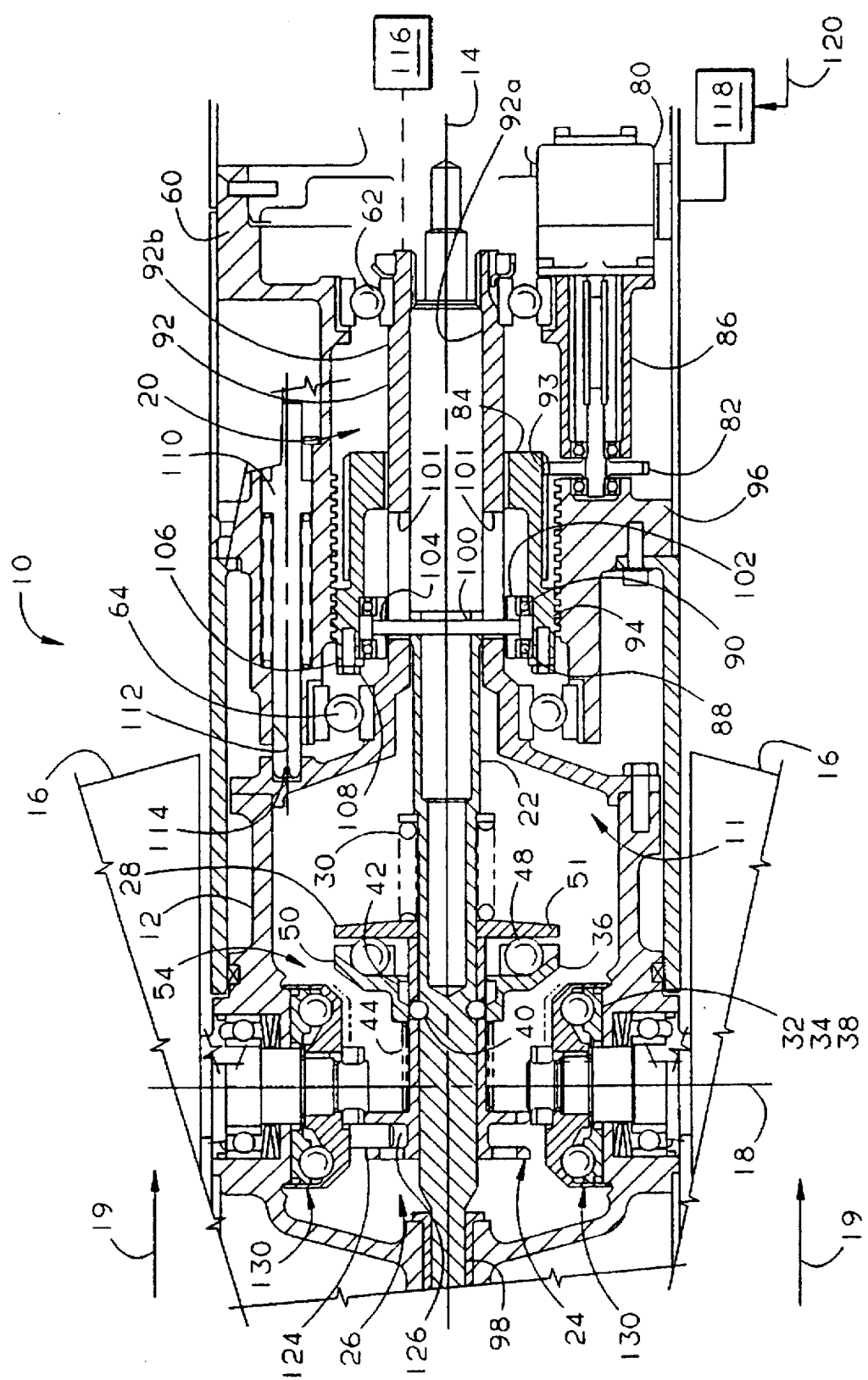
FIG. 1 is a cross-sectional illustration of an air driven turbine in the form of a vortex turbine according to our invention.
Figure 2:
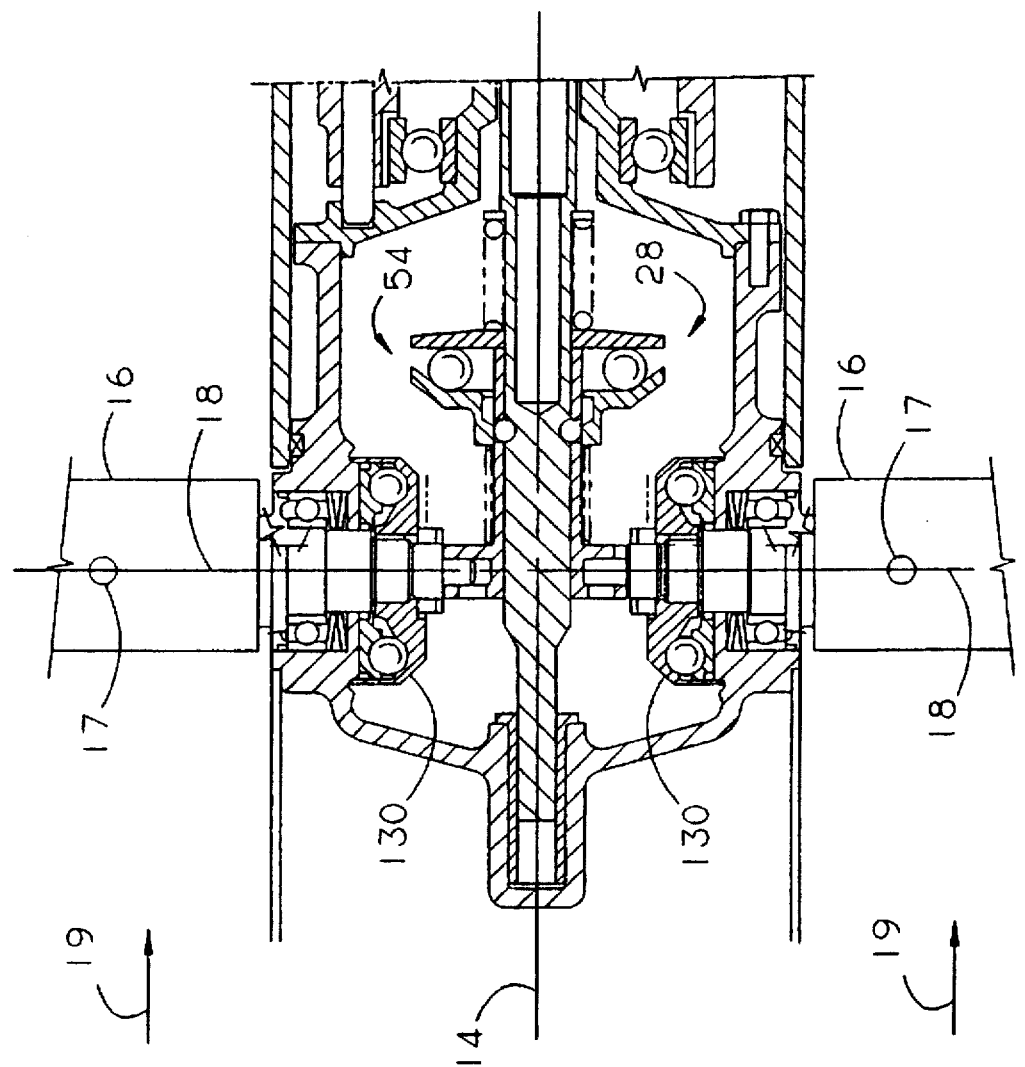
FIGS. 2-3 depict an overspeed mechanism of the vortex turbine of FIG. 1 in a normal operating position and a failsafe position respectively.
Figure 3:
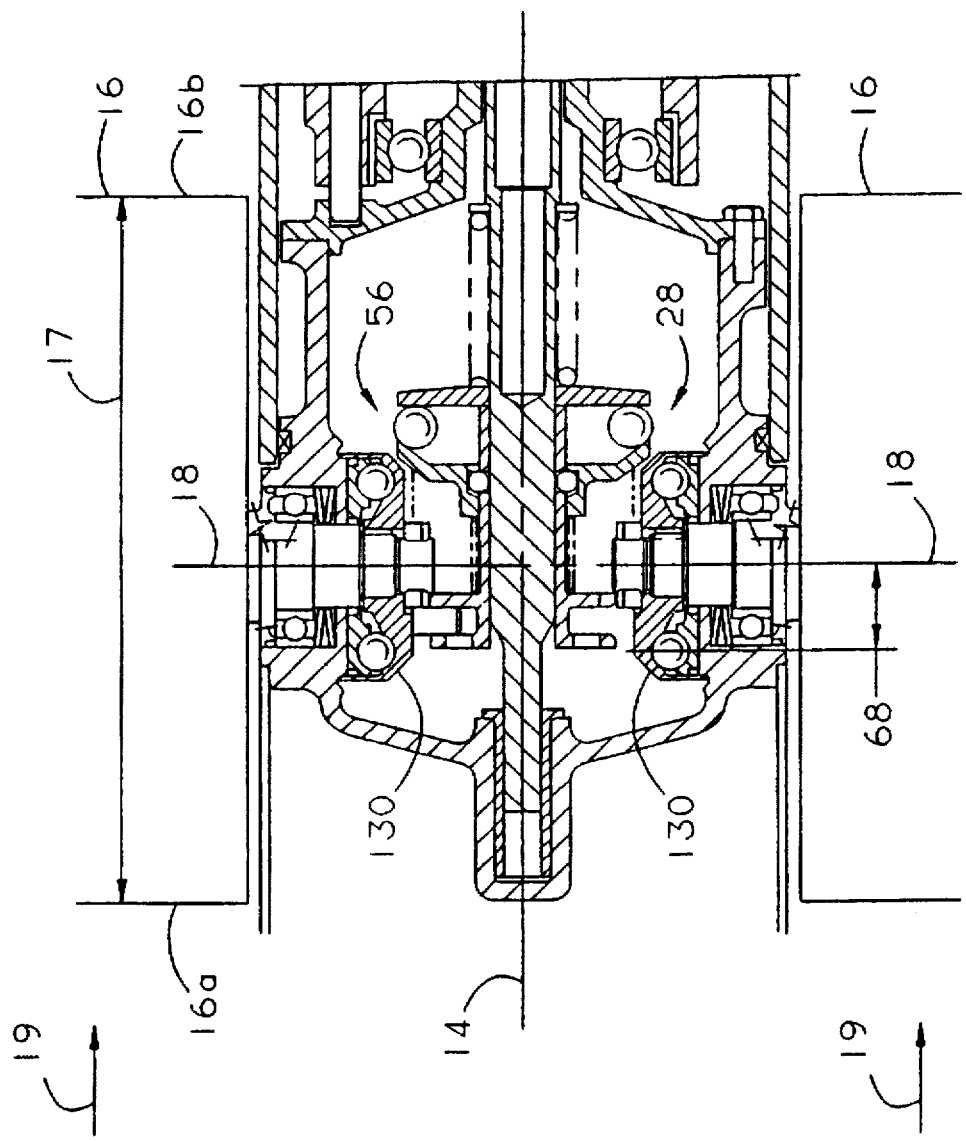

FIGS. 1-8 illustrate an air driven turbine in the form of vortex turbine 10 and a pitch change system 11 according to our invention. The vortex turbine 10 includes a hub 12 mounted in bearings 62, 64 for rotation about an axis of rotation 14. The bearings 62, 64 are supported by a support structure 60 in the form of a strut or pod, etc., attached to an aircraft. A pair of blades 16 extend radially from the hub 12 along a blade pitch axis 18. The blades 16 are attached to the hub 12 in a manner allowing the blades 16 to be rotated about the pitch axis 18 through a range of blade pitches, including a failsafe position. For vortex turbines, or for RATs, this failsafe position is generally referred to as a coarse pitch, or feathered position of the blades 16. FIGS. 1 and 3 illustrate the blades 16 in the coarse pitch or feathered position. When the blades 16 are feathered, they are positioned, as best seen in FIG. 3, such that a chordal axis 17 of the blades 16, extending from a leading edge 16a to a trailing edge 16b of the blade 16 is preferably aligned more parallel than not to the axis of rotation 14. In this position, a flow of air 19 passing over the blades 16 from the leading to the trailing edges 16a, 16b thereof will create minimal lift on the blades 16, thereby causing low speed rotation of the hub 12.

FIG. 2 illustrates the blades 16 in a normal operating position, also known as fine pitch, corresponding to normal rotational speeds of the hub 12 below a predetermined maximum operating speed of the hub 12. At such normal speeds, the blades 16 are positioned such that the chordal axis 17 of the blades 16 is more transverse, or perpendicular, than not with respect to the axis of rotation 14. As illustrated in FIG. 2, the chordal axis 17 will thus extend into and out of the plane of the figure at a more acute angle during normal operation than when the blade is in the failsafe position illustrated in FIGS. 1 and 3.

As shown in FIG. 1, the blade pitch control system 11 includes a pitch change linear actuator 20 having an axially extendable shaft 22, extending therefrom, and disposed for axial movement along the axis of rotation 14. The pitch change actuator of the exemplary embodiment includes an electric motor 80 which is operably connected via a geartrain internal to the motor 80 (not shown) and a drive gear 82 to drive a translating acme nut 84 which is operably connected to the shaft 22 for causing axial movement of the shaft 22 when the acme nut 84 is driven by the electric motor 80. Specifically, the electric motor 80 and drive gear 82 are mounted to the support structure 60 in a manner which does not allow either the motor 80 or the drive gear 83 to translate along the axis 84. The motor 80 and drive gear 82 are further disposed so that motor 80 can rotate the drive gear 82 about a drive gear axis 86 oriented generally parallel to the axis of rotation 14. The acme nut 84 is disposed about and supported by bearings 88, 90 mounted on a hollow portion 92 of the hub 12 extending between the hub support bearings 62, 64. A driven gear portion 93 of the acme nut 84 operably engages the drive gear 82 in a gearmesh relationship such that rotation of the drive gear 82 by the motor 80 will cause the acme nut 84 to rotate simultaneously about the hollow portion 92 of the hub 12 and the axis of rotation 14. The acme nut 84 also includes a threaded portion 94 which operably engages a mating, non-rotating, axially stationary, acme screw portion 96 of the support structure 60 in such a manner that as the acme nut 84 rotates about the axis 14, the engagement of the threaded portion 94 of the acme nut 84 with the acme screw portion 96 of the support structure 60 will cause the acme nut 84 to translate axially with respect to the hub 12 and support structure 60.

The shaft 22 extends through the hollow portion 92 of the hub 12, and is slidingly supported for axial motion with respect to the hub 12 by an inner wall 92a of the hollow portion 92 and a shaft bearing 98 supported by the hub 12. The shaft 22 is restrained to rotate with the hub 12 by a pin 100 extending transversely through the shaft 22 and engaging a pair of axially elongated slots 101 in the hollow portion 92 of the hub 12. The elongated slots 101 are configured to closely abut the pin 100 in a manner that prevents relative rotation between the shaft 22 and the hub 12, but allows the shaft 22 to translate axially with respect to the hub 12.

Each end of the pin 100 also engages a hole 104 in bearing carrier means 102 disposed about the hollow portion 92 of the hub 12 for supporting the radially inner races of the acme nut bearings 88, 90. The bearing carrier means 102 is configured to slide axially along an outer surface 92b of the hollow portion 92 of the hub 12.

Acme nut bearing retainer means in the form of a retainer washer 106 and screws 108 constrain the outer races of the acme nut bearings 88, 90 within the acme nut 84 in such a manner that axial motion of the acme nut 84 is transferred to the shaft 22 via the acme nut bearings, the bearing carrier and retainer means 102, 106, 108, and the pin 100, to thereby cause the shaft 22 to move axially, with respect to the hub 12 and support structure 60, in unison with the shaft 22.

A retractable locking pin 110 is provided for selectively preventing rotation of the hub 12 with respect to the support structure 60. The locking pin 110 slides axially within a bore 112 of the support structure 60 to engage a locking recess 114 in the hub 12.

The blade pitch control system 11 further includes, a yoke 24 slidably mounted for axial movement on the shaft 22. Eccentric arm means 26 operably couple the yoke 24 to the blades 16 in such a manner that axial movement of the yoke 24 causes the blades 16 to rotate about the blade pitch axis 18, thereby changing the pitch of the blades 16 with respect to the axis of rotation 14. As used herein, the terms "pitch of the blades", or "blade pitch", or their equivalents refer to an angle of the chordal axis 17 of the blade 16 with respect to the axis of rotation 14 when viewed through a plane extending generally perpendicularly to the blade pitch axis 18 and containing the chordal axis 17.

In the exemplary embodiment of FIGS. 1–7, the eccentric arm means 26 includes an eccentric pin 124 which engages an annular groove 126 in the yoke 24. The eccentric pin 124 is attached to the blades 16 at a point radially eccentric from the blade pitch axis 18 in such a manner that as the yoke 24 moves axially, the interaction of the annular groove 126 with the eccentric pin 124 will cause the blades 16 to rotate about the blade pitch axis 18 to a new blade pitch. Both of the blades 16 illustrated in the exemplary embodiment operably engage the annular groove 126 in similar fashion so that the blade pitches of both blades 16 are adjusted in unison. Although only two blades 16 are illustrated in FIGS. 1–3, it will be readily apparent that the pitch change mechanism 11 of our invention is also applicable to air driven turbines having fewer or more than two blades 16.

As shown in FIGS. 1 and 2, the yoke 24 is operably coupled to the shaft 22 by resettable, speed responsive, disconnect means 28, in such a manner that below a predetermined disconnect speed of the hub 12 the yoke 24 is constrained to move axially in unison with the shaft 22. Above the disconnect speed, the speed responsive disconnect means 28 actuates and decouples the yoke 24 from the shaft 22 as shown in FIG. 3. The yoke 24 is then free to move axially along the rotational axis 14 independently from the shaft 22. A return spring 30 is provided for urging the yoke 24 toward a failsafe position of the yoke 24 along the rotational axis 14, as indicated at 68 in FIG. 3, when the yoke 24 is decoupled from the shaft 22, thereby driving the blade 16 to the failsafe, coarse pitch position shown in FIG. 3.

The resettable speed responsive disconnect means 28 includes a plurality of detent balls 32 for locking the yoke 24 and shaft 22 together. The shaft 22 includes detent means 34 for receipt and axial retention therein of the detent balls 32. The yoke 24 includes through-holes 38 for receipt and axial retention therein, or passage therethrough of the detent balls 32.

The resettable disconnect means 28 also includes a locking piston 36 disposed for axial movement along the yoke 24 between a locked position 54, as shown in FIGS. 1 and 2, and an unlocked axial position 56, as shown in FIG. 3. The locking piston 36 includes a first surface 40 thereof for retaining the detent balls 32 simultaneously within the through-holes 38 and the detent means 34 when the locking piston is in the locked position, thereby locking the yoke 24 and shaft 22 together such that they move axially in unison. The piston 36 further includes a second surface thereof forming a second detent means 42 for receipt of the detent balls 32 when the locking piston 36 is moved axially to the unlocked position 56.

Figure 4:
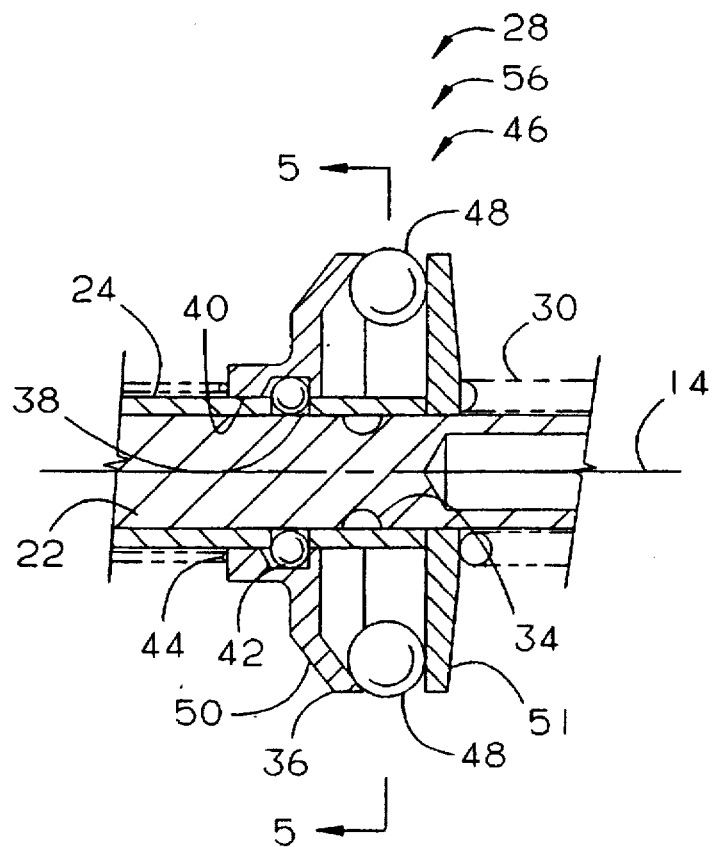
FIGS. 4-5 illustrate various features of the overspeed protection mechanism illustrated in the vortex turbine of FIGS. 1-3.

The first and second detent means 34, 42, the detent balls 32, and the through-holes 38 are compatibly designed such that when the locking piston 36 is in the unlocked position 56, the detent balls 32 will pass through the through-holes 38 into the second detent means 42, as shown in FIG. 4, and fully disengage from the first detent means 34, such that the yoke 24 is free to move axially with respect to the shaft 22. A governor spring 44 is operably connected between the yoke 24 and the locking piston 36 in a manner biasing the locking piston 36 toward the locked position 54.

Figure 5:
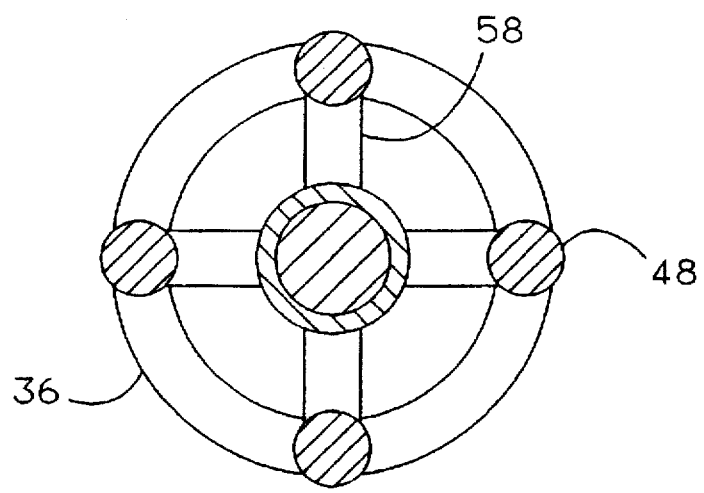

As shown in FIGS. 4 and 5, flyball governor means, generally designated 46, are operably connected between the yoke 24 and the locking piston 36 for urging the locking piston 36 to move from the locked to the unlocked position 54, 56 when the disconnect speed is achieved. The flyball governor means 46 includes a plurality of flyballs 48 disposed in a circular array about the axis of rotation 14 between a first and a second reaction plate 50, 51. The first reaction plate 50 is integrally attached to the locking piston 36. The second reaction plate is axially preloaded against the yoke 24 by a return spring 30. The first and second reaction plates 50, 51 define juxtaposed radially directed ball ramp means, including ball grooves 58 for receipt therein of the flyballs 48. The ball grooves 58 are configured such that as the flyballs 48 move radially outward due to centrifugal force caused by rotation of the hub 12, the flyballs 48 overcome the force of the governor spring 44 and cause the first reaction plate 50 to move axially away from the second reaction plate 51.

The reaction plates 50, 51 flyballs 48 and governor spring 44 are compatibly designed such that at the predetermined rotational speed of the hub 12, the flyball governor means 46 will move the locking piston 36 from the locked to the unlocked axial positions 54, 56. The detent balls 32 then decouple the yoke 24 from the shaft 22. The return spring 30 then drives the yoke 24 to the left as illustrated in FIGS. 1–4, and the yoke 24 in turn drives the blades 16 to the failsafe pitch position illustrated in FIG. 3.

Operation with the Vortex Turbine not Rotating

The vortex turbine 10 of our invention may be operated in a non-rotating mode to provide drag reduction or dissipation of the vortex, without energy extraction. The pitch change mechanism 11 of our invention remains operative, during the non-rotating mode, for positioning the blades to a pitch angle producing maximum drag reduction and/or maximum dissipation.

To operate the vortex turbine 10 in the non-rotating mode, the locking pin 110 is inserted into the locking recess 114, to thereby prevent the hub 12 from rotating with respect to the support structure 30. Pitch control signals are supplied to the electric motor 80 from a controller 118 in response to command signals or parametric inputs 120 received by the controller from an external source. The external command or parametric inputs 120 may be generated manually by the flight crew, or preferably be provided by another computer on-board the aircraft. In a preferred embodiment, the controller 118 would receive a parametric signal proportional to airspeed of the aircraft, and would generate appropriate blade pitch control signals to optimize drag reduction or vortex dissipation.

In response to the pitch change signals received from the controller 118, the electric motor 80 drives the drive gear 82 in an appropriate direction about the drive gear axis 86. The drive gear 82 in turn drives the acme nut 84, by virtue of the gearmesh relationship between the drive gear and the driven gear portion 93 of the acme nut 84, causing the acme nut 84 to rotate about the axis of rotation 14. As the acme nut 84 rotates, the interaction of the threaded portion of the acme nut 84 with the acme screw portion 96 of the support structure 60 causes the acme nut 84 to translate along the axis of rotation 14. The acme nut 84, through the pin 100 in cooperation with the bearing carrier 102 and retaining means 106, 108, causes the shaft 22 to translate along the axis 14 in unison with the acme nut 84. The elongated slots 101 in the hub 12 about the pin 100 allow the acme nut 84 to move axially despite the fact that the hub 12 is stationary with respect to the support structure 30 in the axial direction.

For operation in a non-rotating mode, the disconnect means 28 must be in the locked position 54, as shown in FIGS. 1 and 2. With the disconnect means 28 in the locked position, axial force and motion of the shaft 22 is transferred from the first detent means 34 of the shaft 22, through the detent balls 32, to the wall of the hole 38 in the yoke 24. The yoke 24 in turn transfers the axial force and motion to the eccentric arm means 26 operably connecting the yoke 24 to the blades 16.

Normal Rotating Operation

With an air stream 19 flowing through the blades 16, the blades 16 will generate torque urging the hub 12 to rotate about the axis 14. With the locking pin 110 engaged, as described above, the torque generated by the blades 16 is reacted through the locking pin 110 into the support structure 60, and the hub 12 is prevented from rotating. To allow rotation of the hub 12, the locking pin 110 is retracted. The blades 16 then drive the hub 12 about the axis 14. Power extracted from the airstream 19 by the air driven turbine 10 may then be coupled to a driven device 116, such as an electrical generator or a hydraulic pump, that provides power to the aircraft.

In one operating scenario, for example, it may be desirable to have the vortex turbine locked in the non-rotating mode during normal take-off and flight operations for drag reduction and vortex dissipation. In the event that an in-flight emergency arose, the vortex turbine 10 locking pin 110 would be retracted to allow the vortex turbine to drive an emergency generator or pump 116.

With the locking pin 110 withdrawn, operation of the pitch control mechanism 11 in the normal rotating operating mode is identical to that described above in relation to operation in the non-rotating mode. It is contemplated, however, that during normal rotating operation it will generally be desirable to control power output of the driven device 116 by adjusting the blade pitch, and thereby the rotational speed of the turbine 10. This control of speed is most conveniently accomplished in our invention by including in the controller 118 speed sensing circuits (not shown) for sensing the rotational speed of the electric motor 80, however, other methods known in the art for sensing speed are also applicable. Regardless of the speed sensing method utilized, the controller 118 and pitch control mechanism 11 of our invention provide a convenient and straightforward means of controlling blade pitch in the rotating mode to alternatively or simultaneously optimize power extraction, drag reduction, and/or vortex dissipation.

Overspeed Protection

Should the turbine 10 exceed the predetermined disconnect speed, centrifugally generated forces acting on the flyballs 48 of the governor means 46 will cause the flyballs 48 to move radially outward in the ball-ramp pockets 58, as indicated in FIGS. 3 and 4. As the flyballs 48 move radially outward, the shape of the ball-ramp pockets 58 causes the locking piston 36 to move axially from the locked position 54, as shown in FIGS. 1 and 2, to the unlocked position 56 as shown in FIGS. 3 and 4. With the locking piston 36 in the unlocked position 56, the second detent means 42 of the locking piston 36 are aligned with the through-holes 38 in the yoke 24 in such a manner that the detent balls 32 are thrown radially outward, by centrifugally generated forces, into the second detent means 42, thereby completely disengaging the detent balls 32 from the shaft 22 and decoupling the shaft 22 from the yoke 24. The return spring 30 then forces the yoke 24 to move axially, to the left as depicted, driving the blades to the failsafe position depicted in FIGS. 1 and 2.

Once the yoke 24 is decoupled from the shaft 22 by operation of the disconnect means 42, the shaft 22 is free to move in an axial direction independently from the yoke, thus rendering the pitch change mechanism 11 inoperative until the overspeed protection device 28 is re-set to the locked position 54. It is contemplated that the overspeed protection device would be re-set during overhaul of the air driven turbine 10, subsequent to an overspeed condition, by repositioning the components of the overspeed protection device 28 in the locked position 56, as illustrated in FIGS. 1 and 2. It should be noted that with the overspeed protection device 28 of Our invention, there are no shear pins, etc., to replace in order to re-set the device, thereby greatly facilitating overhaul operations. The disconnect speed at which the overspeed device is triggered may be predetermined by judicious selection and design of the governor spring 44, and other features of the overspeed device, such as the flyballs 48 and the shape of the ball ramp pockets 58.

The blades 16 of an air driven turbine according to our invention may be attached to the hub 12 by any type of bearing arrangement utilized in the past for attaching variable pitch blades to a hub. In a preferred embodiment of Our invention, however, the blades 16 are attached to the hub 12 by radial bearings 150 in combination with specially configured ball ramp thrust bearings 130, as shown in FIGS. 1–3 and 7–8. The ball ramp bearings 130 are configured to provide forces which aid the pitch change mechanism 11 and overspeed protection device 28 in performing their respective functions. The use of similar rolling element/ramp type devices for attaching propeller blades to a hub is illustrated by U.S. Pat. No. 4,948,339 to Adamson. Such devices have not previously been utilized in RATs or vortex turbines, however, and provide particular advantage when coupled with the pitch control mechanism 11 of our invention.

For any type of bladed device rotating about an axis in an airstream, the blades generate centrifugal forces on the hub, and aerodynamic and centrifugal moments acting on the blades about the blade pitch axis. The centrifugal forces generated by the blades 16 are normally reacted by a thrust bearing into the hub 12, while the aerodynamic and centrifugal moments on the blades 16 must be reacted by the pitch change mechanism and/or an overspeed protection device 28. Because both the centrifugal force and the centrifugal moment are a function of the speed squared, they can be quite large in a bladed device rotating at high speed. For an air driven turbine such as a RAT, which typically rotates at several thousand rpm, as opposed to only several hundred rpm for a typical propeller, these centrifugally generated forces may exceed 20,000 pounds for each blade.

A ball ramp bearing 130, of the type depicted in the exemplary embodiment, performs two functions. The first function is to operate essentially as a standard thrust bearing to provide a means for reacting the centrifugally generated forces Fcf acting on the blades 16 into the hub 12. The second function performed by the ball ramp bearing 130 is conversion of a portion of the centrifugally generated force Fcf into a torque for counter-balancing the centrifugal moment generated by the blade.

The axial force Fact which must be provided by the pitch change mechanism 11 to control the pitch of the blades 16 in an air driven turbine according to our invention may be calculated using the following formula:

$$\text{Fact} \geq \left( \frac{Tbr - Tctm - Tatm}{R \times \cos\theta_y} \right) \times N$$

Wherein Tbr represents the counteracting torque generated by the ball ramp bearing; Tctm represents the centrifugal moment generated by the blade; Tatm represents the aerodynamic moment generated by the blade; R is the radius from the blade pitch axis 18 to the centerline of pin 124; and N is equal to the number of blades 16. As indicated schematic in FIGS. 6 and 7, and as will be readily recognized by those having skill in the art, the aerodynamic moment Tatm is respectively quite small in comparison to the centrifugal moment Tctm and the bearing torque Tbr for a bladed device rotating at high speed, such as the vortex turbine 10 of the exemplary embodiment, and can thus be essentially ignored in the design of the ball ramp bearing 130.

Figure 6:
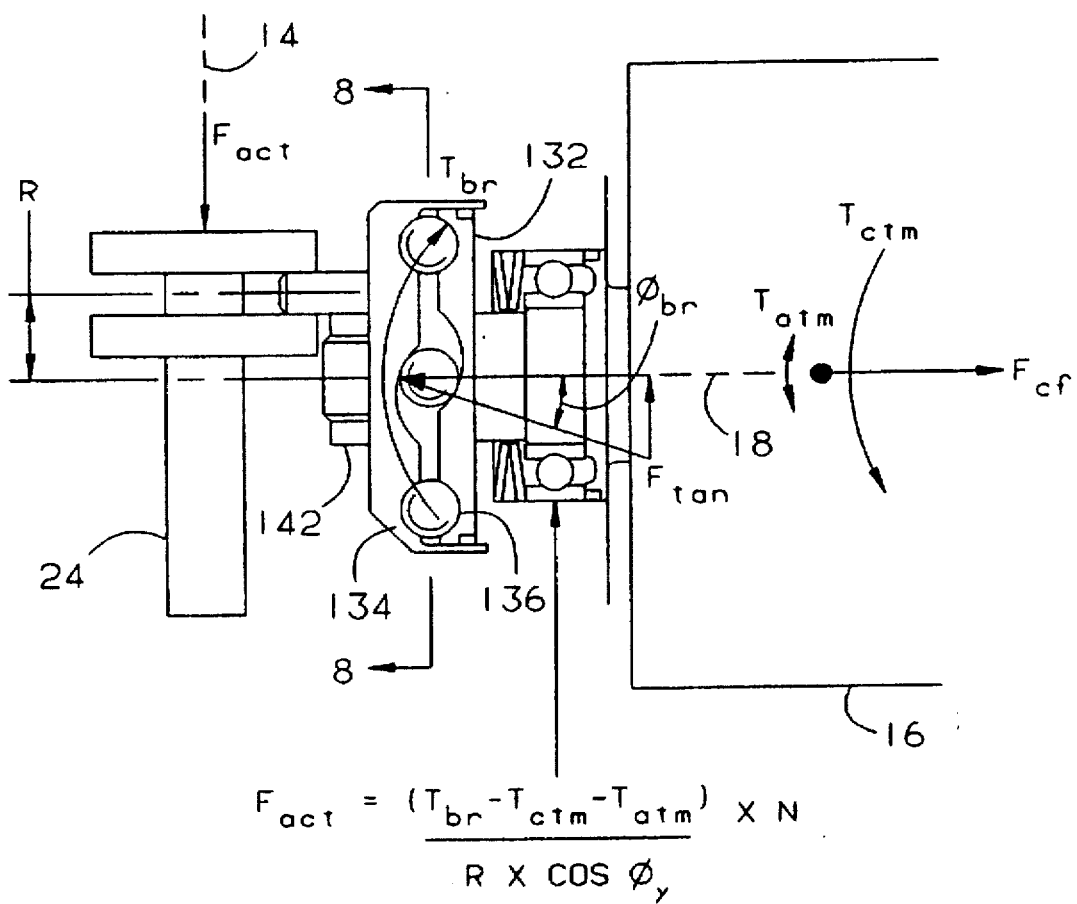
FIGS. 6-8 illustrate various features and operational modes of a ball ramp bearing utilized for attaching the blades to the hub in the vortex turbine of FIGS. 1-3.
Figure 8:
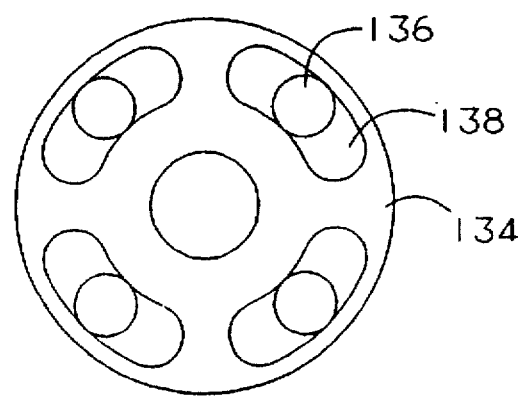
Figure 7:
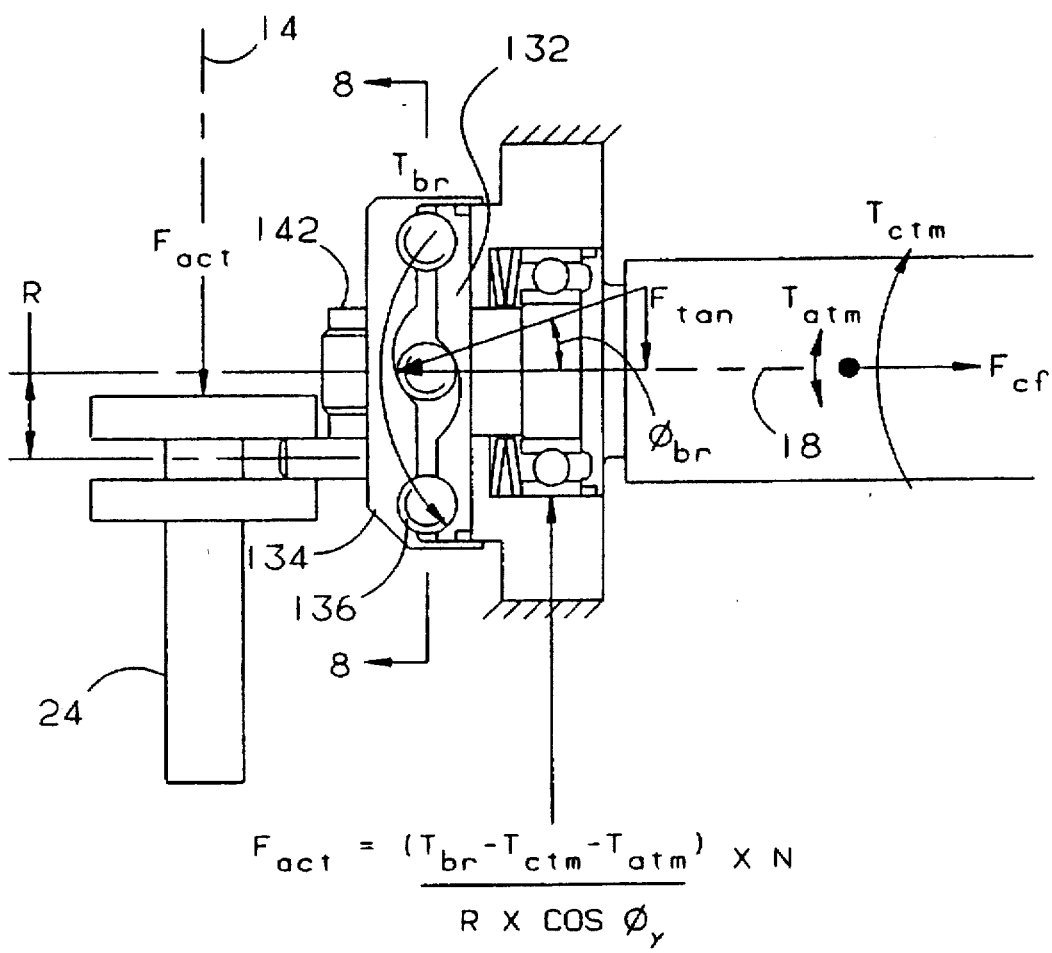

As best seen in FIGS. 6 through 8, the ball ramp bearing 130 includes a radially outer race 132, a radially inner race 134, both respectively including inclined ball ramps 138, 140, for a receipt therein of a plurality of balls 136. The outer race 132 is integrally joined to the hub 12. The root of the blade 16 passes through the outer race in a manner to be rotatable about and axially movable along the blade pitch axis 18. The inner race 134 is integrally joined to the root of the blade 16 for movement axially and rotatably therewith, with respect to the blade pitch axis 18. A set of bellville springs 150 is functionally disposed between the hub 12 and the blade 16 to apply a preloading force across the balls 136 which pulls the inner race 134 toward the outer race 132.

As the turbine 10 rotates, the blades 16 generate the centrifugal force Fcf which is reacted across the ballramp bearing 130. In response to the centrifugal force Fcf, the balls 136 will move up the ball ramps 138, 140, and thereby cause the inner race 134 and blade 16 to rotate a limited distance about the blade pitch axis 18 with respect to the outer race 132. The bellville springs 150 allow a limited amount of radially inward movement of the blade 16 as the balls 136 ride up the ball ramp means 138, 140. As the balls 136 ride up the ramps 138, 140, a wedging action between the balls 136 and the ramps 138, 140 creates the force Ftan and a corresponding bearing torque Tbr which counteracts the centrifugal moment Tctm of the blade.

The amount of axial and rotational movement of the inner race 134 with respect to the outer race 132, as well as the amount of counteracting bearing torque Tbr produced at a given speed is a function of the design of the balls 136 and the ball ramp means 138, 140. As illustrated in FIGS. 6 and 7, and by deduction from the formula above, it will be seen that the various features of the ball ramp bearing 130 may be designed in such a manner that the centrifugal force Fcf acting on the ball ramp bearing 130 will produce a bearing torque Tbr which is essentially equal but oppositely directed about the blade pitch axis 18 to the centrifugal moment Tctm. The bearing torque Tbr and the centrifugal moment Tctm will automatically counterbalance over the entire rotational speed range because both the centrifugal force Fcf which generates the bearing torque Tbr and the centrifugal moment Tctm are functions of the speed squared. The resulting axial force Fact on the pitch change mechanism 11 is thus reduced to a relatively low value needed to overcome the relatively small aerodynamic moment and any small difference between the counterbalanced torque provided by the bearing Tbr and the centrifugal moment Tctm generated by the blades 16.

By virtue of the reduction in axial force required of the actuator Fact, the various components of the pitch change mechanism 11 and the overspeed protection device 28 can be significantly reduced in size thus resulting in lower weight in volume. Lower forces also reduce the power needed to change blade pitch angle, thereby allowing the use of smaller actuators and improved response time.

The ball ramp 138, 140 of the ball ramp bearing 130 can also be designed to have a variable ramp angle θ br to proportionally counterbalance the increased centrifugal moment Tctm at large blade pitch angles. The ball ramp bearing 130 can be configured to further assist the overspeed protection device 28 in the event of a failure of the pitch change mechanism, by selecting ball ramp angles θ br that will create a net torque which will always drive the blades 16 toward the fail safe position. More specifically, to provide such overspeed protection, the ball ramp angles θ br are selected such that the ball ramp moment Tbr will always be larger than the centrifugal moment Tctm, resulting in a net moment tending to urge the blades to move toward a coarse pitch or failsafe position. Such advantageous design and use of the ball ramp angle θ br thus allows the return spring 30 in particular, and the other components of the overspeed protection device 28 to be made generally smaller, lighter, and more compact then they would otherwise have to be.

From the foregoing descriptions, those having skill in the art will readily recognize that our invention has great utility in air driven turbines or other types of rotating devices having one or more variable pitch blades extending from a hub. In particular, it will be recognized that our invention finds particular utility in air driven turbines such as RATs or vortex turbines of the type utilized for: extracting power from an air stream passing by an aircraft; reducing drag on the aircraft; or dissipating a vortex generated by an aircraft in flight. The pitch control mechanism of our invention may be utilized with such devices in either a rotating or a non-rotating mode of operation, or with such devices which must be capable of transitioning between a rotating and non-rotating mode and having pitch control available in either mode. It will further be appreciated that the overspeed protection mechanism of our invention functions independently from the pitch control function, thereby providing an additional measure of safety in comparison to higher mechanisms for controlling variable pitch blades in which the overspeed protection mechanism was not independent of the pitch control function. It will still further be appreciated that through the practice of our invention, an air driven turbine with adjustable pitch blades and overspeed protection may be readily produced in a straightforward manner resulting in low cost and weight, and enhanced reliability.

We wish to emphasize that although we have described our invention herein with respect to several specific embodiments thereof, many other embodiments and applications of our invention are possible within the scope of our invention as described in the appended claims. For example, our invention is applicable to bladed devices having more or less blades then the two bladed version depicted in the figures herein. Our invention is also applicable to variable pitch devices utilizing pitch change actuators of a type different from the electric motor driven acme screw arrangement depicted in the drawings. For instance, other types of electric, hydraulic, or pneumatically powered devices, etc., could also be utilized with equal efficacy. Furthermore, virtually any other type of mechanism, i.e. different from the acme screw depicted, capable of converting rotary motion into axially motion of the shaft 22, such as a recirculating ball screw, could also be utilized. The overspeed protection device of our invention is also applicable in rotating devices using mechanical flyball governor and spring arrangements of the type previously used in ram air turbines.

In summary, we particularly wish to emphasize that many of the details of the various control and actuation features depicted and described herein are simply examples of a virtually unlimited variety of similar features or devices which may be used with facility in practicing our invention. Furthermore, those having skill in the art will readily recognize that some or all of the features and functions of our invention may be utilized independently, or in combinations other than those specifically described or depicted herein without exceeding the scope of our invention. It is understood, therefore, that the spirit and scope of the appended claims should not be limited to the specific embodiments described and depicted herein.

We claim:

1. An air driven turbine comprising:
   a) a hub rotatable about an axis of rotation;
   b) a movable blade extending from said hub along a blade pitch axis passing transversely through the hub, said blade being attached to said hub for rotation of the blade about said blade pitch axis through a range of blade pitches of said blade with respect to said axis of rotation, with said range of blade pitches including a failsafe position of said blade; and
   c) pitch change actuator means for changing said blade pitch of said blade comprising:
      1) a linear actuator having an axially extendable shaft disposed for axial movement along said axis of rotation;
      2) a yoke slidably mounted for axial movement along said shaft;
      3) coupling means operably coupling said yoke to said blade in such a manner that said axial movement of the yoke causes said blade to rotate about said blade pitch axis, thereby changing the pitch angle of said blade with respect to said rotational axis;
      4) speed responsive disconnect means operably connecting said yoke to said shaft in such a manner that: below a predetermined disconnect speed of said hub, about said axis of rotation, said yoke is constrained to move axially in unison with said shaft; and above said predetermined disconnect speed of said hub said disconnect means will decouple said yoke from said shaft such that said yoke may move axially along and with respect to said shaft; and
      5) return spring means for urging said yoke toward an axial position corresponding to said failsafe position of said blade when said disconnect means has decoupled said yoke from said shaft, to thereby drive said blade toward said failsafe position.

2. The air driven turbine of claim 1 wherein said yoke, shaft, and speed responsive disconnect means are configured such that said disconnect means locks said yoke to said shaft for constraining said yoke to move in unison with said shaft when said yoke and said shaft are positioned axially with respect to one another in a locked position, and said responsive disconnect means are configured to be resettable to lock said yoke to said shaft when said yoke and shaft are in said locked position with respect to each other at a predetermined reset speed below said disconnect speed.

3. The air driven turbine of claim 1 wherein said blade pitch change means are operable independent of rotational speed of said hub for adjusting said blade pitch to a selected value of blade pitch at any rotational speed of said hub below said predetermined disconnect speed.

4. The air driven turbine of claim 1 wherein said blade pitch change means are operable for adjusting said blade pitch to a selected value of blade pitch when said hub is not rotating.

5. The air driven turbine of claim 1 wherein said resettable disconnect means comprises:
   a) a detent ball for locking said yoke and said shaft together;
   b) first detent means in said shaft for receipt and axial retention therein of said detent ball;
   c) through-hole means defined by said yoke and extending therethrough for receipt therein and passage therethrough of said detent ball;
   d) a locking piston disposed for sliding axial movement along the yoke between a locked and an unlocked axial position of said piston with respect to said yoke;
      said piston including therein a first surface for retaining said detent balls simultaneously within said through hole and said first detent means to thereby lock said yoke to said shaft when said locking piston is in said locked position;

said piston also including therein second detent means for receipt of said detent ball therein when said locking piston is in said unlocked position, thereby allowing said disconnect means to decouple said yoke from said shaft;

said first and second detent means, detent ball, and said through hole being compatibly configured and respectively disposed such that when said locking piston is moved axially to said unlocked position said detent ball will pass through said through hole into said second detent means and disengage from said first detent means such that said yoke is free to move axially with respect to said shaft;

e) governor spring means operably connected for biasing said locking piston toward said locked position; and f) flyball governor means operably connected between the yoke and the locking piston for urging the locking piston to move from the locked to the unlocked position when the hub is rotated at the disconnect speed.

6. The air driven turbine of claim 5 wherein said flyball governor means comprises:

a) a first reaction plate integrally joined to said locking piston;

b) a second reaction plate integrally joined to said yoke;

c) governor spring means operably connected to urge said first reaction plate toward said second reaction plate; and d) a plurality of flyballs disposed in a circular array about the axis of rotation between said first and second reaction plates;

said first and second reaction plates defining juxtaposed radially directed ball ramp means therein for receipt of said flyballs;

said ball ramps being configured such that as said flyballs move radially outward due to centrifugally generated forces operating thereon when said hub is rotated about said axis of rotation, said balls cause said first reaction plate to move axially away from said second reaction plate against said governor spring; said reaction plates, flyballs, and governor spring being compatibly configured and relatively disposed such that at said disconnect speed of said hub, the flyball governor means move the locking piston from the locked to the unlocked position, thereby allowing the detent ball to decouple the yoke from the shaft which in turn allows the return spring of the pitch change means to drive the blade to the failsafe blade pitch position.

7. The air driven turbine of claim 1 further comprising:

d) ball ramp bearing means for operably attaching said blade to said hub in such a manner that aerodynamic forces acting on the blade, or centrifugally generated forces acting on the blade during rotation of the hub operate to aid said pitch change means in adjusting said blade pitch of said blade.

8. The air driven turbine of claim 7 wherein said yoke of said pitch change actuator means generates an axially directed actuation force for adjusting the blade pitch of said blades and wherein said ball ramp bearing is operably connected to said yoke in such a manner that said ball ramp converts a portion of centrifugally generated forces acting on said blade during operation of said blade into an axially directed force operating to aid said axially directed actuation force.

9. The air driven turbine of claim 7 wherein said blades generate a moment about said blade pitch axis, and said ball ramp bearing is configured to convert a portion of said centrifugally generated forces acting on the blade into a bearing torque for counteracting said moment about said blade pitch axis.

* * * * *